United States Patent [19]
Ernst

[11] Patent Number: 5,505,755
[45] Date of Patent: Apr. 9, 1996

[54] RECYCLABLE OR ENTIRELY COMBUSTIBLE FILTER BAG HOLDING FRAME FOR THE RECEPTION OF FILTER BAGS, AND METHOD OF ITS MANUFACTURE

[75] Inventor: Beat Ernst, Wettingen, Switzerland

[73] Assignee: Zenteco AG, Wettingen, Switzerland

[21] Appl. No.: 394,636

[22] Filed: Feb. 27, 1995

[30] Foreign Application Priority Data

Mar. 1, 1994 [CH] Switzerland ................. 595/94

[51] Int. Cl.$^6$ ................................................. B01D 46/02
[52] U.S. Cl. ........................................ 55/378; 55/DIG. 31
[58] Field of Search ............................... 55/378, DIG. 31

[56] References Cited

U.S. PATENT DOCUMENTS

| | | | |
|---|---|---|---|
| 3,747,773 | 7/1973 | Jackson | 55/DIG. 31 |
| 3,834,134 | 9/1974 | McAllister | 55/378 |
| 4,225,328 | 9/1980 | Stiehl | 55/378 |
| 4,323,378 | 4/1982 | Miljoen | 55/378 |
| 5,256,312 | 10/1993 | Letersky | 55/DIG. 31 |
| 5,320,655 | 6/1994 | Ernst | 55/378 |

*Primary Examiner*—Tim R. Miles
*Attorney, Agent, or Firm*—Frishauf, Holtz, Goodman, Langer & Chick

[57] ABSTRACT

To provide a completely recyclable or incineratable filter bag holding frame, so that the holding frame together with the filter bags can be recycled as a unit, the holding frame is made entirely of recyclable and incineratable material in this manner: two essentially rectangular flat partial frames (1, 4) are made of groups of strips (1, 4), adhered together. Another group of strips (2), is placed on edge; the strips (2) have slits (8) therein extending from opposite edges, and spaced from the ends of the strips by distance slightly less than the width of the strips forming the partial frames. This provides an auxiliary frame (15), which is adhered to (1) of the partial frames. Core elements (5) of corrugated cardboard material are then placed against the assembly of the first partial frame (1) and the auxiliary frame (15), preferably adhered to both the partial end auxiliary frame. The outer surfaces of the core elements are then adhesively connected to on-edge strips (3) which, preferably, are also adhesively connected to the end edges (14) of the auxiliary frame (15) as well as to the first partial frame (1). The entire assembly is covered by a second partial frame (4), which is also adhered to the auxiliary frame (15) the outer strips (3) and the core elements (5). Preferably a hot, or hot-melted adhesive is used. One or both of the partial frames may be formed with inwardly extending projections (16) to be engaged by holding clips (18) of the filter bags (12).

16 Claims, 2 Drawing Sheets

RECYCLABLE OR ENTIRELY COMBUSTIBLE FILTER BAG HOLDING FRAME FOR THE RECEPTION OF FILTER BAGS, AND METHOD OF ITS MANUFACTURE

FIELD OF THE INVENTION

The present invention relates to a filter bag frame, or holder, to receive filter pockets or bags for air or gas filtration systems, particularly for filtration systems in which air which has particles suspended therein is passed through the filter bags, depositing the particles therein, and to a method to make such a filter bag frame, or holder, and especially to such a frame and made by the method, which is entirely disposable together with the filter bags, either by material recycling, or by combustion without requiring any separation of frame material elements from the bags.

BACKGROUND

Holding frames for air or gas filtration systems, particularly air filtration systems, are used to receive filter bags, which, together with the filter bags, form filtration units. The filtration units can be combined in groups or batteries for entire filtration systems. Usually, they are used to clean air or gas streams. Typically, the systems are made of different materials. The frames to receive the filter bags are frequently made of metal, plastic or wood. The filter medium itself is a fine pore fibrous fabric or other fibrous material, made of natural or man-made substances. After some use, the filter bags will be saturated with contaminants and must be replaced. The full filter bags, however, need to be disposed of. Disposal of such full filter bags, that is, bags loaded with dust, dirt or other particles, or soot or the like must be removed from the frames holding the filter bags. This, usually, is disagreeable, manual work. The filter bag frames, customarily, made of metal, or plastic must be separated from the filter bags themselves. Frequently, reception depots require that all material supplied must be entirely recyclable, or combustible as such, and if any components are present which cannot be recycled or burned, the reception stations refuse to receive the entire unit, that is filter bags and frames if of differently recyclable, or non-combustible material.

THE INVENTION

It is an object to provide a front frame for filter bags which is inexpensive and can be recycled, or burned, together with filter bags as a whole unit, and which does not contain any materials which are not recyclable, or non-incineratable.

Briefly, two flat, essentially rectangular material partial frames are made of an incineratable or recyclable material, for example cardboard. An essentially rectangular core construction is placed between these partial frames; the core construction is also rectangular, made of core elements; the core elements and the partial frame are secured together, for example by an adhesive. A first group of strips is assembled to form an essentially rectangular frame which stands on edge, connected to a least one of the flat material partial frames, and positioned at the inside of the core; a second group of strips, likewise on edge, is assembled to form an outer cover for the core elements; the outer group of strips, of course, will have a length and width dimension which is larger than that of the inner frame. The outer strips, likewise, are secured to at least one of the flat material partial frames.

All the materials used in the frame are of incineratable or recyclable material, preferably cardboard for example leather cardboard or brown cardboard.

The method of assembling together this frame, and the resulting frame, use inexpensive lightweight materials, such as recycling cardboard or recycled cardboard, for example. The stacking of the flat material partial frames about the core in combination with the strips, forming the on-edge frame and adhesive connection of the strips, frame and core, as well as a preferably used mechanical connection of the on-edge strips results in a frame which has a high degree of stiffness, is stable and resistant to twisting. The parts can be assembled automatically from the various components, so that inexpensive mass production of the frames is possible.

DRAWINGS

DETAILED DESCRIPTION

Figure 8:
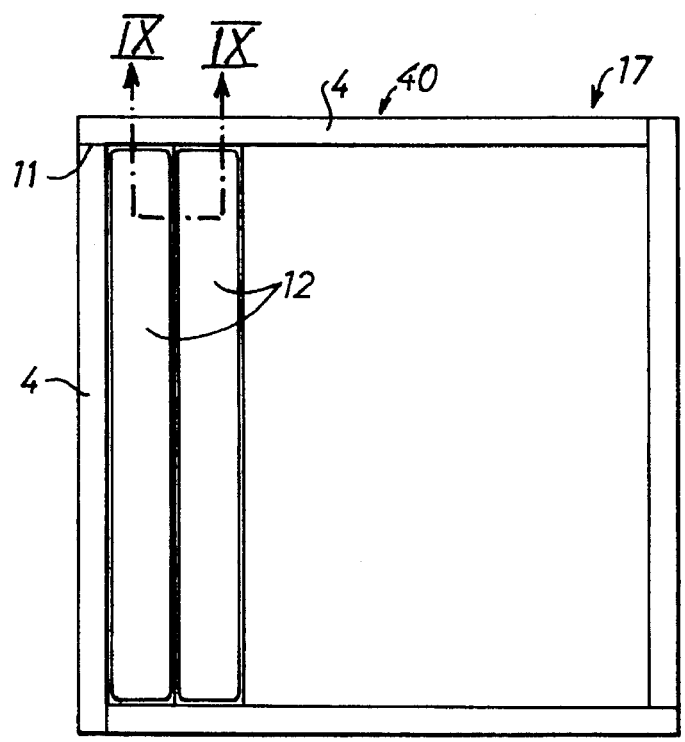
FIG. 8 is a front view of a finished frame with two filter bags inserted therein.

The front frame 17 (FIG. 8) is used to receive filter bags 12. The filter bags 12 are similar, and elongated. They are vertically located within the frame 17. A group of such bags, assembled to the front frame 17, for example, can be coupled together to form entire filtration units. Air or gas to be cleaned is introduced to open ends of the filter bags, for example located between spaced frames 17, and after passage there through, the air can escape through the walls of the filter medium, formed by the filter bags, leaving the air on the other, or outside of the filter bags in cleaned condition. The front frames 17 have generally square or rectangular shape.

In accordance with the feature of the invention the frames 17 are made of incineratable material, preferably cardboard and especially brown cardboard or the material known as leather board. The core formed by one or more core elements is made, preferably, of corrugated cardboards, or zig-zag corrugated boards.

METHOD OF MAKING THE FRONT FRAME

Figure 1:
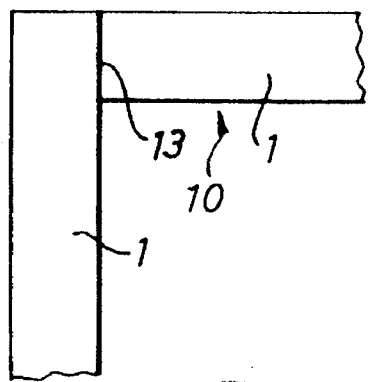
FIG. 1 is a top view of a first step to make a front frame with abutting bottom material strips.
Figure 2:
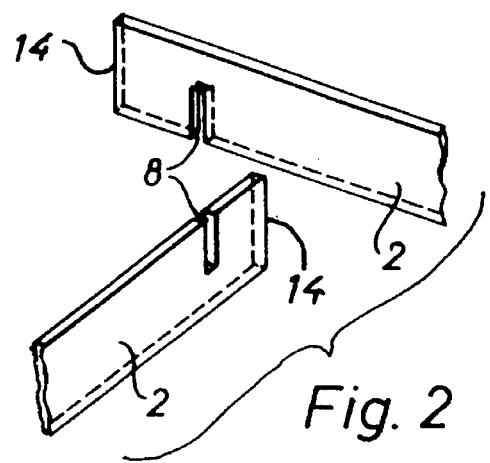
FIG. 2 is an exploded fragmentary view of the inner on-edge frame, and showing a slot-interconnection.

First—see FIG. 1, four elongated flat material frame elements 1 are assembled in a first horizontal plane, to form a square or rectangular partial frame 10, the ends of the frame parts 1 being butted against each other and adhered together at the butting edge 13. A second, or auxiliary frame 15 is made of strips 2 which stand on edge. The frame 15 thus formed, is placed on the partial frame 10 already formed of the strips 1, and adhesively connected thereto at the inside edge of strips 1, see FIG. 3. Preferably, and to improve stability, the strips 2 are formed with inter-engaging slots 8, see FIG. 2, so that they will form a stable on-edge frame 15. The depth of the slits 8 corresponds at least to half the height of the material of strips 2. The slits 8 are spaced from the end edges 14 of the strips 2 by a distance which is slightly less than the width of the material of the strips 1, to accommodate the thickness of the strips 2 on the strips 1, with the ends 14 fitting close to, but not quite up to the edges of the strips 1, as best seen in FIG. 3, to leave room for an outer frame, as will appear below.

Figure 3:
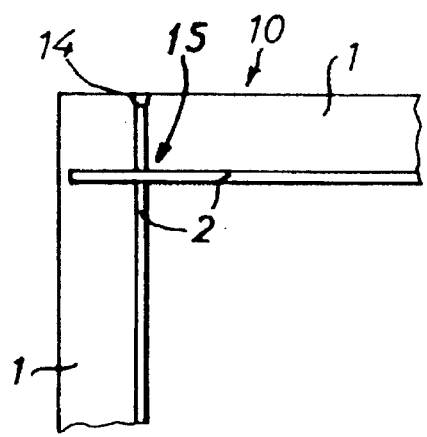
FIG. 3 is a top view of the flat frame of FIG. 1, to which the on-edge frame of FIG. 2, after connection, has been fitted, and, preferably adhered.
Figure 4:
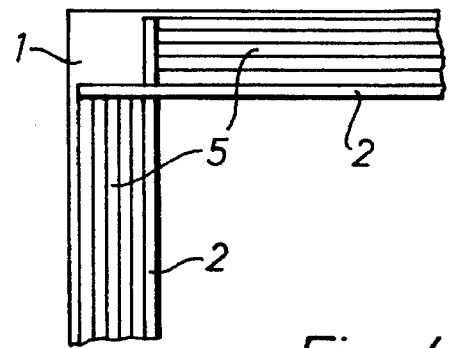
FIG. 4 illustrates another step in the manufacture of the frame, by placement of core elements on the bottom flat material strip and against the inner frame.

A plurality of elongated core elements 5 are then placed on the partially assembled frame of FIG. 3, and adhesively connected with the strips 1 at the bottom thereof. The core elements 5 are made of one or more mutually interconnected layers of corrugated cardboard. The core elements 5 are preferably, also adhesively secured with the on-edge frame 15 formed by the strips 2.

Figure 5:
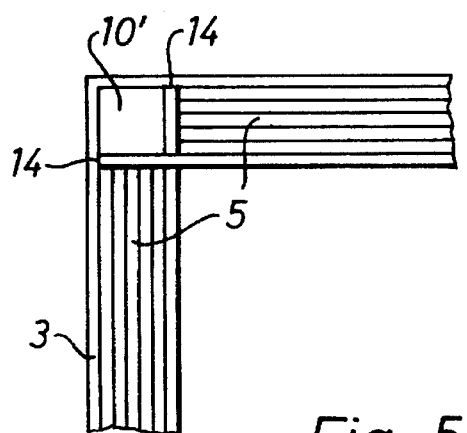
FIG. 5 illustrates a next step in which an on-edge outer strip portion is applied to the frame, showing a fragmentary representation.

An outer frame is then provided formed of a second group of on-edge strips 3. FIG. 5 clearly shows that the strips 3 are secured on-edge, against the core elements 5. The strips 3 are adhesively connected to the bottom material partial frame portions 1, and, preferably, also to the core elements 5. The four, outwardly surrounding strips 3 are located on the flat strips 1, and also engage the ends 14 of the inner on-edge frame 15 formed by the strips 2. The small spacing of the edges 14 of the strips 2 from the outer circumference of the frame portions 1 accommodates the strips 3. The four corners will, each, define a hollow space 10' (FIG. 5). This space can be left empty or, if desired, filled with incineratable material, for example with scrap from the core elements 5, or a small plug made of core elements 5.

Figure 6:
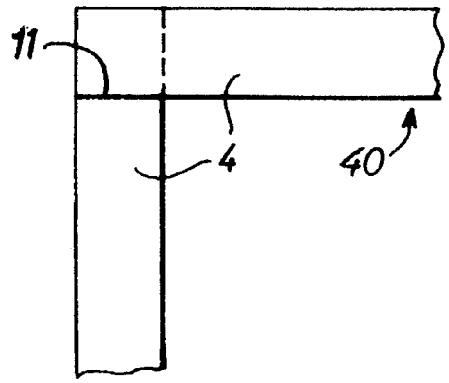
FIG. 6 illustrates a final step in which a top flat material cover is placed on the cored frame previously made.

The frame is completed by applying, at the top side, another partial frame 40 similar to the frame formed by strips 1, see FIG. 1. To complete the frame, four strips 4 are provided, connected together at abutting edges 11 (FIG. 6). The partial frame 40 made of strips 4 is located in a plane parallel to the plane of the partial frame 10 formed of the first strips 1.

The height of the material strips 2 and 3, as well as of the core elements 5 is so selected that, at the upper edge, they are in the same plane. To insure particularly good interconnection, the engagement surfaces 13 (FIG. 1) of the lower strips 1 and the engagement surfaces 11 of the upper strips 4 are offset by 90° with respect to each other. FIG. 6 illustrates in broken line, the engagement surface 13 of strips 1.

To insure that the front frame 17 is stable with respect to its shape, highly resistance towards twisting and, overall, stiff, it is preferred to connect the material strips as well as the core elements 5 all by adhesive, preferably a hot, or hot melt adhesive. All abutting surfaces or edges, like the edges 11, 13, as well as the edges 14 against adjacent strips 3 are likewise adhesively connected, so that a circumferentially closed interiorly stiff and interconnected structure will result.

The final shape of the frame can be in accordance with any desired shape as determined by the overall air cleaning system. In plan view, it can be square, rectangular, of various dimensions, or of other shape; typically, in most usually the frame will be essentially rectangular but it need not be. If a lesser or greater number than four corners are present, the connection is made similar to that described herein.

Figure 7:
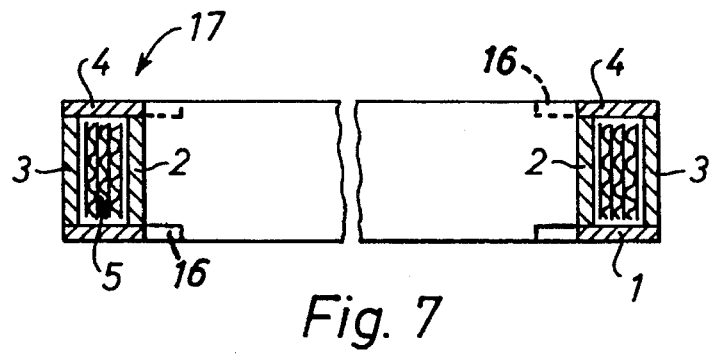
FIG. 7 is a cross-sectional view through a finished front frame for filter bags.
Figure 9:
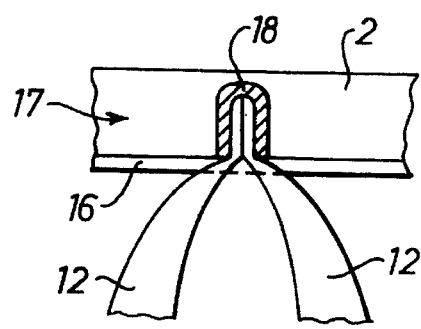
FIG. 9 is a section along lines IX—IX of FIG. 8.

In accordance with another embodiment, the first strips 1, and/or the last material strips 4 are formed with projections 16 extending towards the interior of the front frame, as shown in FIG. 7 in solid and broken lines respectively. These interiorly extending projections 16 provide support for a clamping clip 18, clamping together the ends of the pockets 12 as best seen in FIG. 9.

After use, and when the filter bags 12 are saturated with dust, soot, or other contaminants, it is not necessary to separate the filter bags 12 from the surrounding frontal frame 17; rather, all the filter bags 12 within their respective holding frames 17 and forming an entire filtering assembly can be incinerated as a unit, without residue other than ash, and without liberating any toxic gases; alternatively, and if the materials, and the content of the filter bags, for example cardboard dust, lend themselves to recycling, the entire structure can be recycled without requiring separation of non-recyclable or differently recyclable materials.

I claim:

1. A material recyclable or incineratable filter bag holding frame, made entirely of cellular fibrous recyclable or combustible material, for reception of filter bags (12) in a air or gas-particle filtration system comprising a first essentially rectangular flat material partial frame (10);

a second essentially rectangular flat material partial frame (40) of similar shape and dimension as said first flat material partial frame;

an essentially rectangular core structure of
core elements (5) located between said first and second material partial frames and adhesively secured to said partial frames;

a first group of strips (2) assembled and connected into an essentially rectangular material auxiliary frame (15), in which said strips are positioned on-edge, said strips being located at an inner edge of said first flat partial frame (1), secured thereto, and fitting laterally against said core structure;

a second group of strips (3) placed on-edge, assembled and connected into an essentially rectangular material frame which is larger, in length and width dimension, then said first material partial frame (10) and located at the outside of said core structure, and secured to at least one of: said first and second flat material partial frames (10, 40) and said core structure (5), and wherein all said material partial frames (10, 40) and strips (2, 3), and said core elements (5) are made of similarly recyclable or incineratable material.

2. The frame of claim 1 wherein the material of said holding frame comprises cardboard, optionally brown or leather cardboard; and wherein the core elements (5) comprise a plurality of layers of corrugated cardboard.

3. The frame of claim 1, wherein the flat material partial frames (10, 40), in plan view form a rectangular frame.

4. The frame of claim 1, wherein at least one of the first or second flat material partial frames (10, 40) is formed with projecting frame portions (16) extending inwardly of the holding frame.

5. The frame of claim 1, wherein said essentially rectangular core structure comprises a plurality of said core elements (5) which are rectangularly arranged between said first and second material partial frames.

6. The frame of claim 1, wherein said first group of strips (2) are formed with spaced slits (8) located at a distance from the edge (14) of the respective strip which is less than the width of said first flat material frame (10), said slits (8)

extending over a portion of the width of the respective second group of strips (2); and wherein two adjacent strips of said first group of strips (2) are inter-engaged at the respective slits (8) to form said auxiliary frame (15).

7. The frame of claim 6, wherein the end edges (14) of the first group of strips (2) forming said auxiliary frame (15) are recessed from the end edges of said first flat material partial frame (1) by a distance corresponding approximately to the thickness of the second group of strips to permit adhesive connection of said second group of strips to both said first and second flat material frames (1) as well as against the core elements (5), and against the end edges (14) of said auxiliary frame (15).

8. The frame of claim 1, wherein at least one of said partial frames (10, 40) is assembled of adhesively connected strips (1, 4).

9. The frame of claim 8, wherein the strips (1, 4) forming said partial frames (10, 40) are abutted against each other.

10. A method to make a material recyclable or incineratable filter bag holding frame, said holding frame being made entirely of cellular fibrous recyclable or combustible material, for reception of filter bags (12) in a air or gas-particle filtration system, comprising the steps of (a) providing a plurality of flat strips of material (1) and assembling said strips into an essentially rectangular flat partial frame (10) located in a first plane, in which the ends of said flat strips abut each other;

(b) providing a second plurality of flat strips (2) of material and assembling said second plurality of flat strips of material, on-edge, to form an on-edge auxiliary frame (15), and locating and securing said auxiliary frame on inner edges of said rectangular flat partial frame made in step (a);

(c) providing a third plurality of flat strips of material (4) and assembling said strips into an essentially rectangular flat partial frame (40), with the corners meeting each other to thereby form a second flat partial frame;

(d) before or after step (c) locating a plurality of core elements (5) on said first flat material partial frame formed by said first plurality of flat strips, and outwardly of said auxiliary frame (15);

(e) assembling a fourth plurality of material strips (3), on-edge, at the outside of said core elements (5), and locating and securing said fourth plurality of strips to said flat partial frame (10) made in step (a) and, optionally, against outer surfaces of said core elements (5);

(f) assembling said second flat partial frame (40) formed in step (c), before or after step (e) on the core elements (5) and against said auxiliary frame (15) as well as against said plurality of outer on-edge elements (3).

11. The method of claim 10, wherein said auxiliary frame (15) is made by the steps of forming slits (8) in said second plurality of strips (2), spaced from the edges, and inter-engaging said slits with respect to each other, said slits being spaced from end edges (14) of the respective strips by a distance slightly less than the width of the material strips assembled in step (a).

12. The method of claim 10, including the step of adhering the core elements (5) at least to the strips forming said auxiliary frame (15).

13. The method of claim 10, wherein said strips (1, 4) forming said partial frames (10, 40) comprise cardboard, optionally leather cardboard.

14. The method of claim 10, wherein said core elements (5) comprise a plurality of interconnected, adhesively joined layers of corrugated cardboard.

15. The method of claim 10, wherein in said steps (a) and (c) the step of assembling said strip comprises abutting said strip at corners of the respective partial frame (10, 40) and adhesively connecting said abutted strips.

16. The method of claim 10, wherein said securing steps comprise adhesion; and the step of placing said fourth plurality of on-edge strips (3) includes adhering said strips against outer end edges (14) of said auxiliary frame (15).

* * * * *